Aug. 22, 1967  M. T. STEVENS  3,336,612
FOLDING WINDSHIELD
Filed July 8, 1964  2 Sheets-Sheet 1
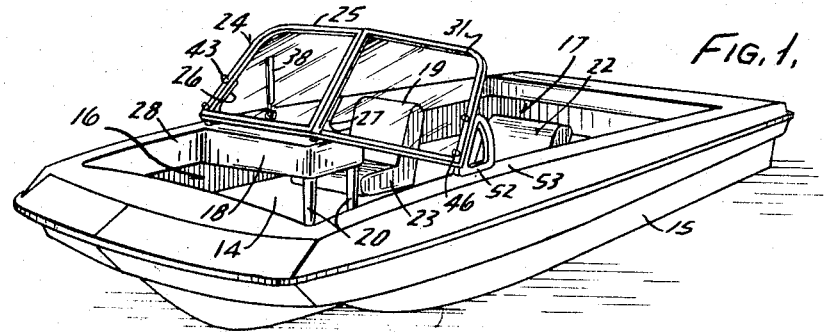
FIG. 1.
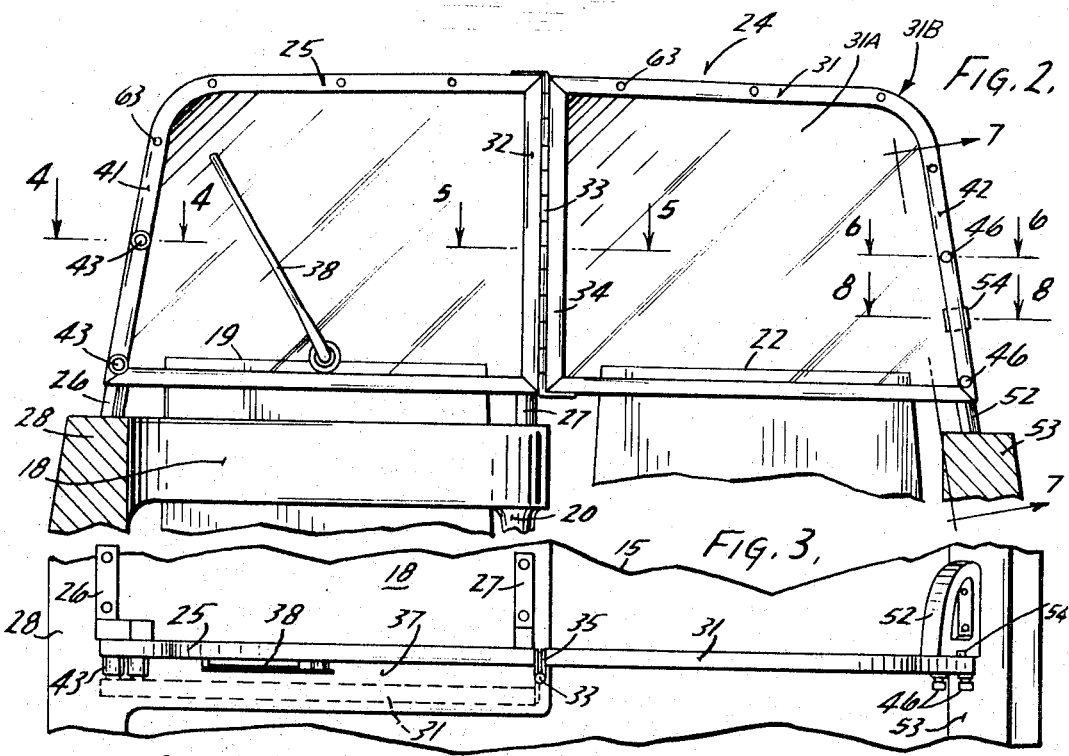
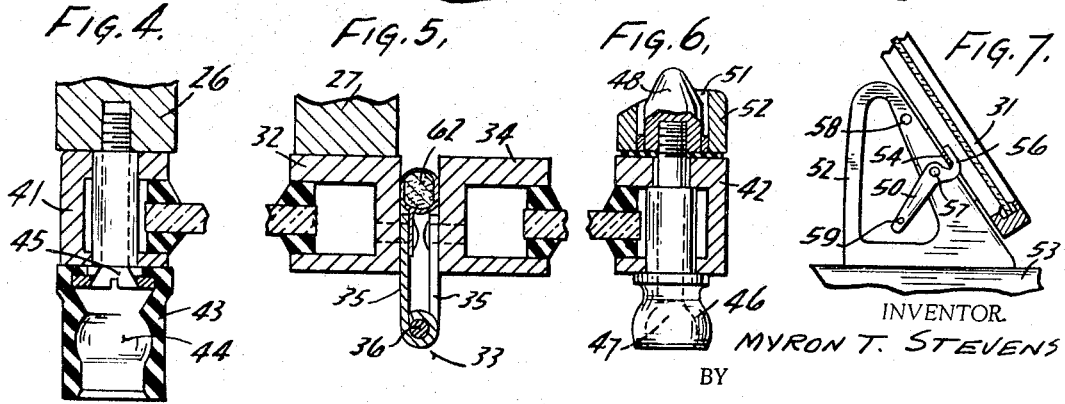
INVENTOR.
MYRON T. STEVENS
BY
Wheeler, Wheeler & Wheeler
ATTORNEYS.

Aug. 22, 1967  M. T. STEVENS  3,336,612

FOLDING WINDSHIELD

Filed July 8, 1964  2 Sheets-Sheet 2

INVENTOR.
MYRON T. STEVENS
BY
Wheeler, Wheeler & Wheeler
ATTORNEYS.

United States Patent Office 3,336,612
Patented Aug. 22, 1967

3,336,612
FOLDING WINDSHIELD
Myron T. Stevens, Kenosha, Wis., assignor to Outboard Marine Corporation, Waukegan, Ill., a corporation of Delaware
Filed July 8, 1964, Ser. No. 381,009
13 Claims. (Cl. 9—1)

This invention relates to folding windshields and to boats and windshield arrangements.

While the windshield of the present invention has utility in other applications, it is particularly adapted for use in a boat having fore and aft compartments or cockpits in which the windshield is disposed intermediate said compartments to shield personnel in the aft compartment. In the disclosed embodiment of the invention, one section of the windshield is fixed to the boat to shield the pilot, and a movable section is hingedly connected to the fixed section and when unfolded extends across a passageway between said compartments to shield a passenger seated next to the pilot. The movable windshield section can be folded laterally against the fixed section to clear the passageway for free movement of personnel between compartments.

The windshield sections are respectively provided with detent means to releasably fasten the sections together in their folded position. The detent means and the hinge upon which the sections fold are desirably made so that when the sections are folded, they will be held in spaced apart relationship. Accordingly, the movable section will be clear of a windshield wiper for the fixed section, even when the sections are folded.

Releasable detent means are also provided to releasably fasten the movable section to the boat when the sections are unfolded and the movable section extends across the passageway to shield the passenger next to the pilot.

Other objects, features and advantages of the present invention will appear from the following disclosure in which:

FIGURE 1 is a perspective view of a boat equipped with a folding windshield embodying the present invention.

FIGURE 2 is a fragmentary vertical cross section taken through the boat just forwardly of the windshield and showing the windshield in front elevation.

FIGURE 3 is a top view of the windshield showing its movable section unfolded in full lines and folded in broken lines.

FIGURE 4 is a fragmenatry cross section taken along the line 4—4 of FIGURE 2.

FIGURE 5 is a fragmentary cross section taken along the line 5—5 of FIGURE 2.

FIGURE 6 is a fragmentary cross section taken along the line 6—6 of FIGURE 2.

FIGURE 7 is a cross section taken along the line 7—7 of FIGURE 2.

Figure 11:
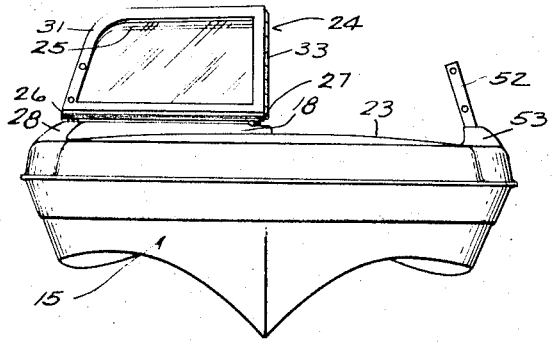
FIGURE 11 is a front view of a boat having a windshield according to the present invention, with the windshield folded.

As shown in FIG. 1, the boat 15 includes a hull which is open at the top and which has a deck 14, and a forward compartment or cockpit 16 and an aft compartment or cockpit or passenger well 17. These are partially separated by a partial bulkhead 18 which projects inwardly from side 28 of the boat. Bulkhead 18 is elevated from the boat floor on legs 20. Bulkhead 18 provides an instrument panel, etc. for the boat pilot for whom the pilot seat 19 is provided.

Alongside the pilot seat 19 there is also desirably provided a passenger seat 22 so that a passenger may be seated alongside the pilot. There is no bulkhead in front of the passenger seat 22, this space being left open to provide a passageway 23 between the fore and aft compartments 16, 17.

In accordance with the present invention, a folding windshield 24 is disposed intermediate the fore and aft compartments to shield the pilot and any passenger in the aft compartment 17. The windshield 24 consists of a plurality of sections laterally hinged one to another. The sections are conventional per se, consisting of metal frames and transparent panes of glass or plastic. In the embodiment herein shown, there is a fixed windshield section 25 fastened to the boat 15 on the brackets 26, 27, and a movable section 31 hinged to the fixed section 25. Bracket 26 is fastened to the deck of the boat side 28 and bracket 27 is fastened to the deck of the bulkhead 18. Fixed section 25 shields the pilot in seat 19.

Movable section 31 includes a transparent element 31A and a frame 31B which supports the element 31A, which includes siderails 34 and 42, and which, as shown best in FIGS. 1 and 2, is of relatively small dimensions as compared to the transparent element. Siderail 34 is pivotally connected to a siderail 32 of the fixed windshield section 25 on the piano hinge 33. As best shown in FIGURE 5, the piano hinge 33 has leaves 35 fastened to the respective siderails 32, 34 and a pivot pin 36, the axis of which is offset forwardly from the planes of the respective sections 25, 31. Accordingly, when movable section 31 is swung to its folded position, as shown in broken lines in FIGURE 3, there will be a space 37 between the respective sections 25, 31. This will leave room for a windshield wiper 38 with which the fixed windshield section 25 is provided.

The respective outermost siderails 41, 42 of the respective fixed and movable windshield sections 25, 31 are provided with spaced sets of releasable detents to fasten the fixed and movable windshield sections together in their folded position. As best shown in FIGURE 4, one part of each set of detents consists of a rubber or like resilient cup 43, the hollow interior of which forms a ball socket 44. Cup 43 is mounted on rail 41 by a screw 45 which desirably also extends beyond the rail 41 to fasten the fixed windshield section 25 to its bracket 26.

As best shown in FIGURE 6, the other part of each set of detents is mounted on the outermost rail 42 of the movable windshield section 31 and comprises a ball 46 having a hollowed interior which receives the screw 47 by which the ball 46 is attached to the siderail 42. Screw 47 desirably extends therebeyond to also fasten a guide lug 48 to the rail 42.

When the movable section 31 is folded against the fixed section 25, the balls 46 of the respective detents will resiliently engage with the cups 43 of the respective detents to hold the windshield sections in folded condition. This connection is easily released simply by manually pulling on section 31 to swing section 31 about hinge 33, unfold the windshield and restore it to its full line position shown in FIGURE 3. The balls 46 will be released by the cups 43 which will yield for this purpose in the initial movement of the section 31. In unfolded position the guide lugs 48 opposite each ball 46 are received within sockets 51 on bracket 52 which is mounted on the deck of boat side 53. The cups 43 extend far enough forwardly from the rails 41 to constitute stand-off legs and coact with the hinge leaves 35 to maintain the spacing 37 between sections 25, 31 as shown in FIGURE 3.

Figure 8:
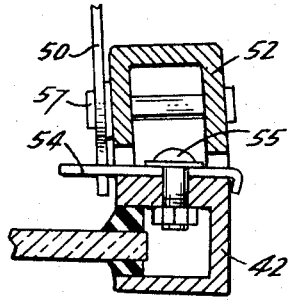
FIGURE 8 is a fragmentary cross section taken along the line 8—8 of FIGURE 2.
Figure 9:
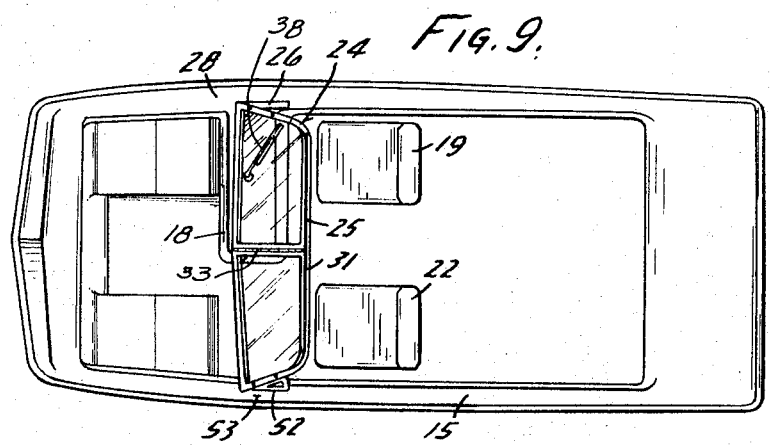
FIGURE 9 is a plan view of a windshield equipped boat as shown in FIGURE 1.
Figure 10:
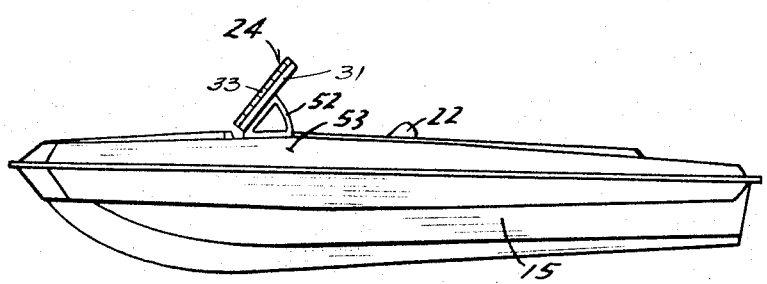
FIGURE 10 is a side view of a windshield equipped boat as shown in FIGURE 1.

As best shown in FIGURE 8, siderail 42 of the movable windshield section 31 is also provided with a latch plate 54 fastened to the siderail by screw 55. Latch plate 54 projects laterally beyond the inside face of the bracket 52 (FIG. 8) for coaction with a pivoting hook 56 on lever arm 50 which is mounted on pin 57 to the inside face of the bracket seat 52. Hook 56 is movable between one position in which it engages the latch plate 54, as shown in FIGURE 7, and a released position in which lever arm 50 is swung about its pivot 57 to engage its detent 59 with detent 58 on the inside face of bracket 52, thus to secure the hook 56 in disengaged postion and permit the movable windshield section 31 to be folded. In the course of folding movement, guide lugs 48 will withdraw from their sockets 51 in the bracket 52.

When the windshield is unfolded, as shown in FIGURE 5, a weather seal strip 62 between the respective adjacent rails 32, 34 will be compressed slightly to preclude air leakage through the hinge 33.

From the foregoing it is clear that a passenger in seat 22 can enjoy the benefits of a windshield, yet it may easily be swung aside to clear the passageway 23. The detents 43, 46 and catch 54, 56 will secure the movable section 31 either in folded or unfolded position and the boat may run in either such position without the movable section 31 shaking free.

The windshield sections may further be provided along their top and side edges with fasteners 63 to which a top may be secured. The presence of section 31 thus facilitates provision for a top and is an advantageous construction when compared to a boat lacking the movable section 31.

Windshields embodying the present invention may suitably be adapted for any type of vehicle, particularly where it is desired to swing one part of the windshield out of a passageway between fore and aft compartments or cockpits.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

What is claimed is:

1. A windshield having a plurality of laterally adjacent sections and hinge means between said sections for laterally folding one section with respect to another section, a windshield wiper on at least one of said sections, said hinge means comprising leaves respectively connected to said sections and pivot means offset laterally from at least one of said sections whereby said sections will be spaced apart when folded to clear said windshield wiper.

2. The device of claim 1 in which said sections are further provided with releasable detent means to releasably hold one section folded with respect to another section, said detent means comprising stand-off means to maintain the sections in spaced apart relation when folded.

3. The combination of a boat hull and a windshield mounted on said boat hull, said windshield extending substantially wholly across said boat hull and having a first section fixed to said boat hull and extending partially transversely across said boat hull from one side thereof, and a second hinged section to said first section for movement relative to a position in transverse relation to said boat hull across substantially the remainder of the width of said boat hull.

4. The combination of a boat hull having fore and aft compartments with an open top and with a deck and a passageway between said compartments, and a windshield mounted on said boat hull intermediate said compartments, said windshield having a first section fixed to said boat hull and extending partially transversely across said boat hull, and a second section hinged to said first section for movement relative to a position in transverse relation to said boat hull and across said passageway and terminating in substantially spaced vertical relation above said deck so as to partially obstruct said passageway.

5. The combination of a boat hull, a windshield mounted on said boat hull, said windshield having a first section fixed to said boat hull and extending partially transversely across said boat hull, a second section, a hinge connecting said second section to said first section for movement of said section between an extended position in transverse relation to said boat hull and a folded position in overlying relation to said first section, said hinge comprising leaves respectively connected to said sections and pivot means offset laterally from at least one of said sections whereby to space said sections from each other when said second section is in said folded position, and releasable means on said first and second sections to hold said second section in said folded position and including standoff means to maintain said sections in spaced apart relation when said second section is in said folded position, and a windshield wiper mounted for wiping of said first section and located forwardly of said first section and between said first and second sections when said second section is in said folded position.

6. The combination of a boat hull, a windshield mounted on said boat hull, said windshield having a first section fixed to said boat hull and extending partially transversely across said boat hull, a second section, a hinge connecting said second section to said first section for movement of said second section between an extended position in transverse relation to said boat hull and a folded position in overlying relation to said first section, said hinge comprising leaves respectively connected to said sections and pivot means offset from at least one of said sections whereby to space said sections from each other when said second section is in said folded position, and releasable means on said first and second sections to hold said second section in said folded position and including standoff means to maintain said sections in spaced apart relation when said second section is in said folded position, releasable means on said boat hull and on said second section for holding said second section in said extended position, and a windshield wiper mounted for wiping of said first section and located forwardly of said first section and between said first and second sections when said second section is in said folded position.

7. The combination of a boat hull, a windshield mounted on said boat hull, said windshield having a first section fixed to said boat hull and extending partially transversely across said boat hull, a second section comprising a transparent element and a frame supporting said element and of relatively small dimensions as compared to said element, a hinge connecting said second section to said first section for movement of said section between an extended position in transverse relation to said boat hull and a folded position in overlying relation to said first section, said hinge comprising leaves respectively connected to said sections and pivot means offset laterally from at least one of said sections whereby to space said sections from each other when said second section is in said folded position, and releasable means on said first and second sections to hold said second section in said folded position and including standoff means to maintain said sections in spaced apart relation when said second section is in said folded position, and a windshield wiper mounted for wiping of said first section and located forwardly of said first section and between said first and second sections when said second section is in said folded position.

8. The combination of a boat hull, a windshield mounted on said boat hull, said windshield having a first section fixed to said boat hull and extending partially transversely across said boat hull, a second section comprising a transparent element and a frame supporting said element and of relatively small dimensions as compared to said element, a hinge connecting said second section to said first section for movement of said second section between an extended position in transverse relation to said boat hull and a folded position in overlying relation to said first section, said hinge comprising leaves respectively connected to said sections and pivot means offset from at least one of said sections whereby to space said sections from each other when said second section is in said folded position, and releasable means on said first and second sections to hold said second section in said folded position and including standoff means to maintain said sections in spaced apart relation when said second section is in said folded position, releasable means on said boat hull and on said second section for holding said second section in said extended position, and a windshield wiper mounted for wiping of said first section and located forwardly of said first section and between said first and second sections when said second section is in said folded position.

9. The combination of a boat hull having a passenger well with a deck and a windshield mounted on said boat hull forwardly of at least a part of said passenger well, and extending substantially wholly across said boat hull and said windshield having a first section fixed to said boat hull and extending partially transversely across said boat hull from one side thereof, and a second section hinged to said first section for movement relative to a position in transverse relation to said boat hull across substantially the remainder of the width of said boat hull and terminating in substantially spaced vertical relation above said deck.

10. The combination of a boat hull having a passenger well with a deck and with an open top, and a windshield mounted on said boat hull forwardly of at least a part of said passenger well, said windshield having a first section fixed to said hull and extending partially transversely across said boat hull, and a second section hinged to said first section for movement relative to a position in transverse relation to said boat hull and terminating in substantially spaced vertical relation above said deck.

11. The combination of a boat hull having a passenger well with a deck, a windshield mounted on said boat hull, said windshield extending substantially wholly across said boat hull and having a first section fixed to said boat hull and extending partially transversely across said boat hull from one side thereof, a second section hinged to said first section for movement relative to an extended position in transverse relation to said boat hull across substantially the remainder of the width of said boat hull and a folded position in overlying relation to said first section and terminating in substantially spaced vertical relation above said deck, and releasable means on said first and second sections to hold said second section in said folded position, and releasable means on said boat hull and on said second section for holding said second section in said extended position.

12. The combination of a boat hull having a passenger well with a deck, a windshield mounted on said boat hull, said windshield extending substantially wholly across said boat hull and having a first section fixed to said boat hull and extending partially transversely across said boat hull, a second section, a hinged connecting said second section to said first section in a position terminating in substantially spaced vertical relation above said deck and for movement of said section between an extended position in transverse relation to said boat hull across substantially the remainder of the width of said boat hull and a folded position in overlying relation to said first section, said hinge comprising leaves respectively connected to said sections and pivot means offset laterally from at least one of said sections whereby to space said sections from each other when said second section is in said folded position, and releasable means on said first and second sections to hold said second section in said folded position and including standoff means to maintain said sections in space apart relation when said second section is in said folded position, and a windshield wiper mounted for wiping of said first section and located forwardly of said first section and between said first and second sections when said second section is in said folded position.

13. The combination of a boat hull having a passenger well with a deck, a windshield mounted on said boat hull, said windshield extending substantially wholly across said boat hull and having a first section fixed to said boat hull and extending partially transversely across said boat hull, a second section, a hinge connecting said second section to said first section in a position terminating in substantially spaced vertical relation above said deck and a folded position in overlying relation to said first section, said hinged comprising leaves respectively connected to said sections and pivot means offset from at least one of said sections whereby to space said sections from each other when said second section is in said folded position, and releasable means on said first and second sections to hold said second section in said folded position and including standoff means to maintain said sections in spaced apart relation when said second section is in said folded position, releasable means on said boat hull and on said second section for holding said second section in said extended position, and a windshield wiper mounted for wiping of said first section and located forwardly of said first section and between said first and second sections when said second section is in said folded position.

References Cited
UNITED STATES PATENTS

| D. 193,817 | 10/1962 | Luger. | |
| 1,481,548 | 1/1924 | Gongaware | 296—85 |
| 1,788,436 | 1/1931 | Lunt | 9—1 |
| 1,946,954 | 2/1934 | Ventura. | |
| 2,379,529 | 7/1945 | Kennedy. | |
| 3,134,112 | 5/1964 | Hage | 9—1 |

MILTON BUCHLER, *Primary Examiner.*

T. M. BLIX, *Assistant Examiner.*